United States Patent
Pei et al.

(10) Patent No.: US 11,051,272 B2
(45) Date of Patent: Jun. 29, 2021

(54) METHOD FOR ARRANGING BROADCAST MESSAGE IN OPERATING SYSTEM AND ELECTRONIC DEVICE

(71) Applicant: Guangdong OPPO Mobile Telecommunications Corp., Ltd., Guangdong (CN)

(72) Inventors: Runsheng Pei, Guangdong (CN); Liangjing Fu, Guangdong (CN); Ruyu Wu, Guangdong (CN); Zhiyong Lin, Guangdong (CN); Jun Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/565,425

(22) Filed: Sep. 9, 2019

(65) Prior Publication Data
US 2020/0008174 A1  Jan. 2, 2020

Related U.S. Application Data

(63) Continuation of application No. PCT/CN2018/078626, filed on Mar. 9, 2018.

(30) Foreign Application Priority Data

Mar. 10, 2017 (CN) .......................... 201710140760.6

(51) Int. Cl.
*H04W 72/04* (2009.01)
*H04W 72/00* (2009.01)
(Continued)

(52) U.S. Cl.
CPC ..... *H04W 72/005* (2013.01); *H04M 1/72403* (2021.01); *H04M 1/72484* (2021.01); *H04W 72/10* (2013.01)

(58) Field of Classification Search
CPC .............. H04W 72/005; H04W 72/10; H04M 1/72522; H04M 1/72597; G06F 2209/548; G06F 9/542
See application file for complete search history.

(56) References Cited

U.S. PATENT DOCUMENTS

| | | | | |
|---|---|---|---|---|
| 5,784,615 A | * | 7/1998 | Lipe | G06F 9/468 719/324 |
| 2005/0183096 A1 | * | 8/2005 | Branigan | G06F 9/542 719/328 |

(Continued)

FOREIGN PATENT DOCUMENTS

| | | |
|---|---|---|
| CN | 103401896 A | 11/2013 |
| CN | 103491507 A | 1/2014 |

(Continued)

OTHER PUBLICATIONS

Extended European Search Report for European Application No. 18764720.1 dated Feb. 7, 2020.
(Continued)

*Primary Examiner* — Hassan Kizou
*Assistant Examiner* — Mahbubul Bar Chowdhury

(57) ABSTRACT

A method for arranging a broadcast message in an operating system and an electronic device are provided. The method includes determining a broadcast receiver of the broadcast message when the broadcast message is sent from the broadcast sender; determining a priority of the broadcast message according to the broadcast receiver; determining an insertion location of the broadcast message in a broadcast message queue according to the priority of the broadcast message; and arranging the broadcast message at the insertion location such that the broadcast message is inserted into the broadcast message queue.

19 Claims, 4 Drawing Sheets

(51) Int. Cl.
  *H04W 72/10* (2009.01)
  *H04M 1/72403* (2021.01)
  *H04M 1/72484* (2021.01)

(56) References Cited

U.S. PATENT DOCUMENTS

| | | | | |
|---|---|---|---|---|
| 2006/0109857 A1* | 5/2006 | Herrmann | ............... | H04L 47/10 |
| | | | | 370/412 |
| 2007/0206620 A1* | 9/2007 | Cortes | .................... | H04L 47/50 |
| | | | | 370/412 |
| 2014/0013271 A1 | 1/2014 | Moore et al. | | |
| 2018/0081778 A1* | 3/2018 | Terho | ....................... | G06N 5/02 |

FOREIGN PATENT DOCUMENTS

| | | |
|---|---|---|
| CN | 103532823 A | 1/2014 |
| CN | 103593217 A | 2/2014 |
| CN | 103826008 A | 5/2014 |
| CN | 103888619 A | 6/2014 |
| CN | 104254074 A | 12/2014 |
| CN | 105357648 A | 2/2016 |
| CN | 106851016 A | 6/2017 |
| KR | 20150005343 A | 1/2015 |
| WO | 2005096148 A2 | 10/2005 |

OTHER PUBLICATIONS

International search report for PCT/CN2018/078626, dated May 25, 2018.
English translation of First Office Action in a counterpart Chinese Patent application No. 201710140760.6, dated Nov. 22, 2018.
Indian First Examination Report for IN Application 201917039875 dated Jan. 20, 2021. (6 pages).

\* cited by examiner

METHOD FOR ARRANGING BROADCAST MESSAGE IN OPERATING SYSTEM AND ELECTRONIC DEVICE

CROSS-REFERENCE TO RELATED APPLICATION(S)

This application is a continuation of International (PCT) Patent Application No. PCT/CN2018/078626 filed on Mar. 9, 2018, which claims priority of the Chinese Patent Application No. 201710140760.6, filed on Mar. 10, 2017, the contents of both of which are herein incorporated by reference in their entireties.

TECHNICAL FIELD

The present disclosure generally relates to the technical field of system broadcasts, and for example, relates to a method for arranging a broadcast message in an operating system and an electronic device.

BACKGROUND

Android system is currently a widely-used operating system for a terminal such as a mobile phone. In the Android system, there are many different applications. In order to quickly transmit information among different applications, the broadcast mechanism is adopted in the Android system to implement information transmission. When there is a message to notify different applications, the message is sent to different applications through the broadcast mechanism.

In the Android system, broadcast messages sent from broadcast senders is not limited, and then one broadcast sender can send any number of broadcast messages randomly, or send the broadcast message very frequently, which causes a problem of there being many broadcast messages to be processed in the broadcast message queue. Thus, important broadcast messages cannot be processed in time, which causes abnormalities for system functions.

SUMMARY

According to one aspect of the present disclosure, a method for arranging a broadcast message in an operating system, the method includes determining a broadcast receiver of the broadcast message when the broadcast message is sent from the broadcast sender; determining a priority of the broadcast message according to the broadcast receiver; determining an insertion location of the broadcast message in a broadcast message queue according to the priority of the broadcast message; and arranging the broadcast message at the insertion location such that the broadcast message is inserted into the broadcast message queue.

According to another aspect of the present disclosure, an electronic device is provided, which includes a non-transitory memory storing a computer program, and a processor, wherein the processor is configured to execute the computer program to determine a broadcast receiver of a first broadcast message when the first broadcast message is sent from a broadcast sender; determine a priority of the first broadcast message according to the broadcast receiver; determine an insertion position of the first broadcast message in a broadcast message queue according to the priority of the first broadcast message; and arrange the first broadcast message at the insertion location such that the first broadcast message is inserted into the broadcast message queue.

According to yet another aspect of the present disclosure, a non-transitory storage medium is provided, which stores a computer program, when executed, causing a processor to determine a broadcast receiver of a first broadcast message when the first broadcast message is transmitted by a broadcast transmitter; determine a priority of the first broadcast message according to the broadcast receiver; determine an insertion position of the first broadcast message in a broadcast message queue according to the priority of the first broadcast message; and arrange the first broadcast message at the insertion location such that the first broadcast message is inserted into the broadcast message queue.

DETAILED DESCRIPTION

Figure 1:
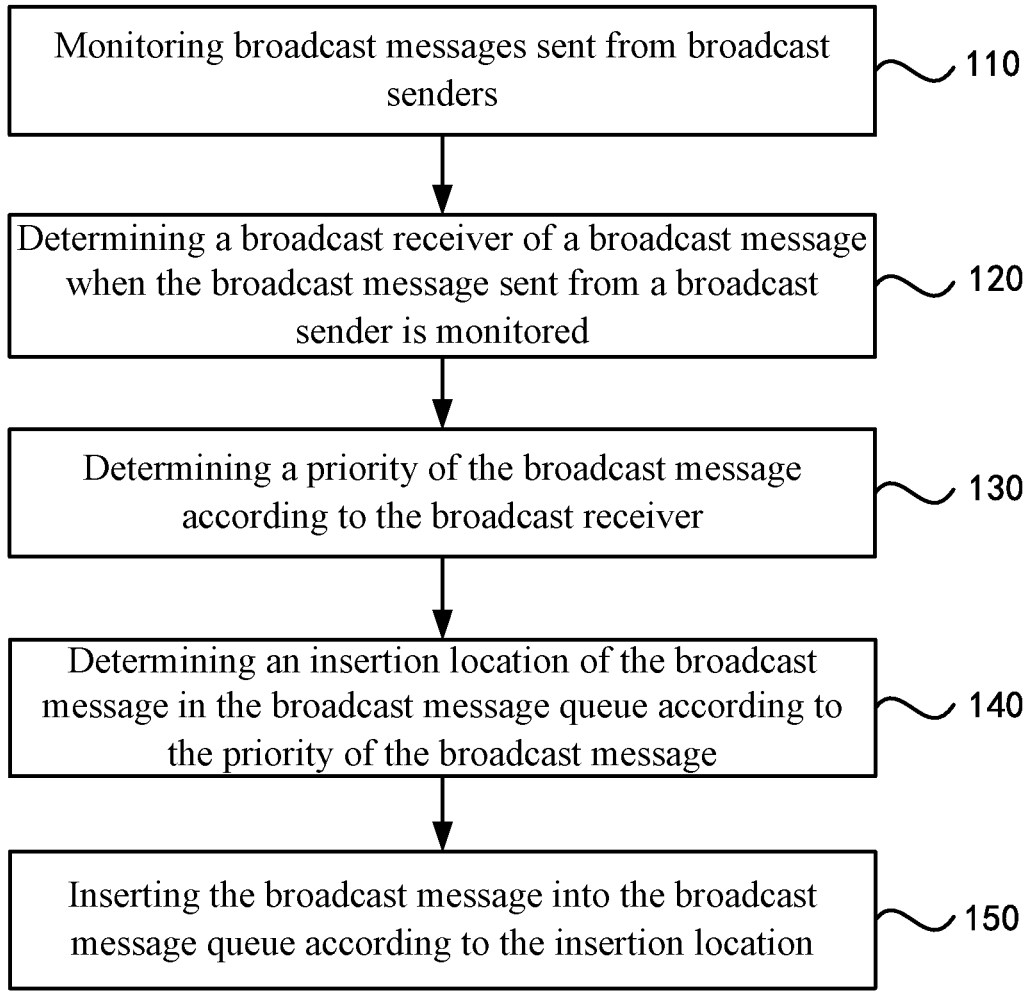
FIG. 1 is a flowchart of a method for arranging a broadcast message according to an embodiment.

The drawings only illustrate a part of but not all of contents related to an embodiment. Some embodiments are described as a method or process as depicted in the flowchart. Although the flow chart may describe each step as a process to be performed in order, many of the steps may be performed in parallel, concurrently or simultaneously. Further, the order of the steps may be rearranged. When an operation is completed, the process may be terminated, but may contain additional steps that are not shown in the drawings. The process may relate to a method, a function, a procedure, a sub-routine, a sub-program and the like.

A method for arranging a broadcast message in an operating system is provided. The method includes determining a broadcast receiver of the broadcast message when the broadcast message is sent from the broadcast sender; determining a priority of the broadcast message according to the broadcast receiver; determining an insertion location of the broadcast message in a broadcast message queue according to the priority of the broadcast message; and arranging the broadcast message at the insertion location such that the broadcast message is inserted into the broadcast message queue.

In one embodiment, the determining a priority of the broadcast message according to the broadcast receiver includes: counting a use frequency of the broadcast receiver in a preset period; and determining the priority of the broadcast message according to the use frequency.

In one embodiment, the determining a priority of the broadcast message according to the use frequency includes: determining a frequency range in which the use frequency is located; and determining the priority of the broadcast message according to the frequency range.

In one embodiment, the determining a priority of the broadcast message according to the broadcast receiver includes: determining that the broadcast message has a higher priority than all broadcast messages in the broadcast message queue when the broadcast receiver of the broadcast message is currently running.

In one embodiment, the broadcast message queue includes a plurality of broadcast messages, each of the plurality of broadcast messages in the broadcast message queue has a corresponding priority; and the determining an insertion location of the broadcast message in a broadcast message queue according to the priority of the broadcast message includes: comparing the priority of the broadcast message with priorities of the broadcast messages in the broadcast message queue; and determining the insertion location of the broadcast message in the broadcast message queue according to a result of the comparing.

In one embodiment, a broadcast message with a first priority in the broadcast message queue is located before another broadcast message with a second priority in the broadcast message queue, wherein the first priority is higher than the second priority.

In one embodiment, the determining the insertion location of the broadcast message in the broadcast message queue according to a result of the comparing includes: determining the insertion location of the broadcast message to be next to one broadcast message in the broadcast message queue when the one broadcast message in the broadcast message queue has a priority same to that of the broadcast message; determining whether the priority of the broadcast message is higher than that of all broadcast messages in the broadcast message queue when no broadcast message in the broadcast message queue has a priority same to that of the broadcast message; determining the insertion location of the broadcast message to be a head of the broadcast message queue when the priority of the broadcast message is higher than that of all broadcast messages in the broadcast message queue; determining whether the priority of the broadcast message is lower than that of all broadcast messages in the broadcast message queue when the priority of the broadcast message is not higher than that of all broadcast messages in the broadcast message queue; determining the insertion location of the broadcast message to be a tail of the broadcast message queue when the priority of the broadcast message is lower than that of all broadcast messages in the broadcast message queue; and determining two adjacent broadcast messages in the broadcast message queue which have priorities adjacent to the priority of the target broadcast message, and determining the insertion location of the broadcast message to be between the two adjacent broadcast messages when the priority is not lower than that of all broadcast messages in the broadcast message queue, wherein one of the two adjacent broadcast messages has a priority higher than the priority of the broadcast message and another of the two adjacent broadcast messages has a priority lower than the priority of the broadcast message.

In one embodiment, after the inserting the broadcast message into the broadcast message queue, the method further includes identifying broadcast receivers of a current broadcast message according to an order of broadcast messages in the broadcast message queue; and distributing the current broadcast message to the broadcast receivers.

In one embodiment, the operating system includes Android system; and the broadcast message transmitted by the broadcast transmitter is monitored through ActivityManagerService.

In one embodiment, the broadcast receiver of the broadcast message is determined through a broadcast receiving process configured for registering to receive the broadcast message.

An electronic device is provided, which includes a non-transitory memory storing a computer program, and a processor, wherein the processor is configured to execute the computer program to determine a broadcast receiver of a first broadcast message when the first broadcast message is sent from a broadcast sender; determine a priority of the first broadcast message according to the broadcast receiver; determine an insertion position of the first broadcast message in a broadcast message queue according to the priority of the first broadcast message; and arrange the first broadcast message at the insertion location such that the first broadcast message is inserted into the broadcast message queue.

In one embodiment, the priority of the first broadcast message is determined according to the use frequency of the broadcast receiver in a preset period.

In one embodiment, the priority of the first broadcast message is determined according to a frequency range in which the use frequency is located.

In one embodiment, the broadcast message queue includes a plurality of second broadcast messages. The priority of the first broadcast message is determined according to whether the broadcast receiver of the first broadcast message is currently running, wherein the priority of the first broadcast message is higher than that of all the second broadcast messages when the broadcast receiver of the first broadcast message is currently running.

In one embodiment, the broadcast message queue includes a plurality of second broadcast messages, each of the plurality of second broadcast messages has a corresponding priority. The insertion location of the first broadcast message in the broadcast message queue is determined according to a result of comparing the priority of the first broadcast message with priorities of the second broadcast messages.

In one embodiment, a second broadcast message with a first priority in the broadcast message queue is located immediately before another second broadcast message with a second priority in the broadcast message queue, wherein the first priority is higher than the second priority.

In one embodiment, the insertion location of the first broadcast message is determined to be next to one second broadcast message in the broadcast message queue when the one second broadcast message and the first broadcast message have the same priority. The insertion location of the first broadcast message is determined to be a head of the broadcast message queue when the priority of the first broadcast message is higher than that of all the second broadcast messages. The insertion location of the first broadcast message is determined to be a tail of the broadcast message queue when the priority of the first broadcast message is lower than that of all the second broadcast messages. The insertion location of the first broadcast message is determined to be between two adjacent second broadcast messages which have priorities adjacent to the priority of the first broadcast message when the priority of the first broadcast message is not lower than that of all the second broadcast messages in the broadcast message queue, wherein one of the two adjacent second broadcast message has a priority higher than the priority of the first broadcast message, and another of the two adjacent second broadcast message has a priority lower than the priority of the second broadcast message.

In one embodiment, the operating system includes Android system; and the first broadcast message transmitted by the broadcast transmitter is monitored through ActivityManagerService.

In one embodiment, the broadcast receiver of the first broadcast message is determined through a broadcast receiving process configured for registering to receive the first broadcast message.

A non-transitory storage medium is provided, which stores a computer program, when executed, causing a processor to determine a broadcast receiver of a first broadcast message when the first broadcast message is transmitted by a broadcast transmitter; determine a priority of the first broadcast message according to the broadcast receiver; determine an insertion position of the first broadcast message in a broadcast message queue according to the priority of the first broadcast message; and arrange the first broadcast message at the insertion location such that the first broadcast message is inserted into the broadcast message queue.

FIG. 1 is a flowchart of a method for arranging a broadcast message according to an embodiment of the present disclosure. The method is suitable to determine a location of a broadcast message in a broadcast message queue when the broadcast message is monitored. The method may be performed by an apparatus for arranging a broadcast message. The apparatus may be realized by software and/or hardware, and may usually be integrated in a terminal. The terminal may be a smart phone, a tablet computer, etc. The method may include actions/operations in the following blocks.

At block 110, the method monitors broadcast messages sent from broadcast senders.

The broadcast mechanism refers to a communication manner between components in the operating system of the terminal, and is a mechanism widely used to send messages between applications. For example, in the Android system of the terminal, a broadcast message is sent after some operations are completed. The broadcast message can be a type of event message data generated in the operating system. For example, if a text message is sent or a phone call is made, one broadcast message will be sent. When one application receives the broadcast message, the application can perform corresponding processing. The broadcast sender may be the system or an application software. The application software may be a third-party application software installed on the terminal such as a mobile phone or an application provided by the system itself. For example, the third-party application software installed on the terminal may be a WeChat client, a QQ client, a Taobao client, or an Alipay client. The application provided by the system itself may be calendar, clock, weather, or notes. The broadcast message may be a message for system broadcast or an application broadcast, wherein the system broadcast may include a bright-screen broadcast, a blackout broadcast, an unlock broadcast, a network state change broadcast, a Bluetooth state change broadcast, a switching language broadcast, and a switching theme broadcast, and the application broadcast may be a broadcast made by the application software.

A broadcast manager (such as ActivityManagerService) in the terminal can monitor all broadcast senders in the system and detect whether there is one broadcast sender to send a broadcast message. ActivityManagerService plays a central role in the broadcast mechanism of the Android system, and is configured for registration operations and releasing operations of all the broadcast in the system. The registration operation means a process in which a broadcast receiving unit (i.e. a broadcast receiving process) is registered by an application to ActivityManagerService. The releasing operation means that a broadcast sender sends a broadcast message to ActivityManagerService, and the ActivityManagerService checks which broadcast receiving unit subscribe to the broadcast message in its own registration center and sends the broadcast message to the broadcast receiving unit one by one, after receiving the broadcast message. In the Android system, monitoring broadcast messages sent from broadcast senders means that ActivityManagerService monitors whether the broadcast senders send the broadcast messages to ActivityManagerService. When ActivityManagerService monitors that there is one broadcast sender to send a broadcast message to ActivityManagerService, it is determined that the broadcast sender sends the broadcast message.

At block 120, the method determines a broadcast receiver of a broadcast message when the broadcast message sent from a broadcast sender is monitored.

When the broadcast manager monitors the broadcast message sent from the broadcast sender, the broadcast manager searches a broadcast receiving unit who is registered to receive the broadcast message. Thus, the broadcast receiver receiving the broadcast message is determined.

For example, in the Android system, the broadcast sender sends a broadcast message to be sent to the ActivityManagerService, and the ActivityManagerService checks which broadcast receivers subscribe to the broadcast message in the registration center after receiving the broadcast message, and then determine broadcast receiver (application or system) that receives the broadcast message through a broadcast receiving unit (i.e. a broadcast receiving process) registered to receive the broadcast message.

At block 130, the method determines a priority of the broadcast message according to the broadcast receiver.

After the broadcast receiver of the broadcast message is determined, the priority of the broadcast message may be determined according to importance of the broadcast receiver. For example, if the broadcast receiver is the system, it is determined that the broadcast message has a high priority. If the broadcast receiver is a third-party application, it is determined that the broadcast message has a low priority.

For example, the priority of a broadcast message can be set to include highest priority, secondary priority, and normal priority. It also specifies that a broadcast message with the highest priority is queued to the head of the broadcast message queue and can be processed fast, a broadcast message with the secondary priority is ranked behind the broadcast message with the highest priority in the broadcast message queue and may be processed after the broadcast message with the highest priority has been processed, a broadcast message with normal priority is queued after the broadcast message with the secondary priority in the broadcast message queue and may be processed after the broadcast message with highest priority and the broadcast message with the secondary priority have been processed, broadcast messages with same priority may be processed in an order in which they are queued.

In an embodiment, determining the priority of the broadcast message according to the broadcast receiver may include counting a use frequency of the broadcast receiver in a preset period, and determining the priority of the broadcast message according to the use frequency.

After the broadcast receiver of the broadcast message is determined, the use frequency of the broadcast receiver by the user within a preset period before the current time point is acquired, and then the priority of the broadcast message is determined according to the use frequency. If the use frequency of is high, the broadcast messages is set to have a high priority, which increases the speed for which highly active applications receive the broadcast message.

In an embodiment, determining a priority of the broadcast message according to the use frequency includes determining a frequency range in which the use frequency is located, and determining the priority of the broadcast message according to the frequency range.

The correspondence between frequency ranges and the priorities of broadcast messages can be established in advance. A frequency range in which a use frequency is located is determined according to the use frequency of the broadcast receiver within a preset period, and the priority of the broadcast message may directly be determined according to the frequency range and the correspondence. Thus, broadcast messages of broadcast receivers with high use frequency may be processed more quickly, and then processing speed of the broadcast messages is increased.

In another embodiment, determining the priority of the broadcast message according to the broadcast receiver may include determining that the broadcast message has a higher priority than all the broadcast messages in the broadcast message queue when the broadcast receiver of the broadcast message is currently running.

If the broadcast receiver is an application which is currently running, it is determined that the priority of the broadcast message is highest, which is higher than that of all the broadcast messages in the broadcast message queue. For example, if WeChat is currently running, and new information is sent, a broadcast message for the new information is generated. However, there are many broadcast messages in the current broadcast message queue which are waiting to be processed, and the broadcast message for the new information may only be arranged into the broadcast message queue subsequently by some related technologies. In this way, the broadcast message for the new information needs to wait for a long time to be processed. However, the method in this embodiment can determine that the broadcast message for the new information has the highest priority, and directly arranges the broadcast message for the new information at the head of the broadcast message queue. The broadcast message for the new information can be processed in time, so that the user receives the new information in time.

At block 140, the method determines an insertion location of the broadcast message in the broadcast message queue according to the priority of the broadcast message.

The broadcast message queue is arranged in an order of priority of the broadcast messages, in which the broadcast message with highest priority are arranged at the head of the queue, and the broadcast message with lowest priority is arranged at the tail of the queue.

Since the broadcast message queue is arranged in the order of priority of the broadcast messages, the insertion location of the broadcast message in the broadcast message queue can be directly determined according to the priority of the broadcast message.

For example, there are three priorities for the broadcast messages, which include the highest priority, the secondary priority, and the lowest priority. If there only are a broadcast message with the secondary priority and a broadcast message with the lowest priority in the current broadcast message queue, and the currently monitored broadcast message has the highest priority, then it can be determined that the insertion location of the broadcast message in the broadcast message queue is the head of the queue.

In an embodiment, determining the insertion location of the broadcast message in the broadcast message queue according to the priority of the broadcast message may include the following actions/operations.

The priority of the broadcast message may be compared with priorities of the broadcast messages in the broadcast message queue.

The insertion location of the broadcast message in the broadcast message queue may be then determined based on a result of the comparison.

The broadcast message queue is arranged in an order from the highest to the lowest priority. After the priority of the broadcast message is determined, the priority is compared with the priorities of the broadcast messages in the broadcast message queue, and then the insertion location of the broadcast message in the broadcast message queue may be determined. Thus, it improves the processing speed of the broadcast message.

In an embodiment, determining the insertion location of the broadcast message in the broadcast message queue according to the result of the comparison may include the following actions/operations.

The insertion location of the broadcast message may be determined to be next to a broadcast message with same priority when there is a broadcast message having the same priority with the broadcast message in the broadcast message queue.

Whether the priority of the broadcast message is higher than that of all the broadcast messages in the broadcast message queue may be determined when there is no broadcast message having the same priority with the broadcast message in the broadcast message queue.

The insertion location of the broadcast message may be determined to be the head of the broadcast message queue if the priority of the broadcast message is higher than that of all the broadcast messages in the broadcast message queue.

Whether the priority of the broadcast message is lower than that of all the broadcast messages in the broadcast message queue may be determined when the priority of the broadcast message is not higher than that of all the broadcast messages in the broadcast message queue.

The insertion location of the broadcast message may be determined to be the tail of the broadcast message queue if the priority of the broadcast message is lower than that of all the broadcast messages in the broadcast message queue.

If the priority of the broadcast message is not lower than that of all the broadcast messages in the broadcast message queue, two adjacent broadcast messages in the broadcast message queue, one of which has a priority higher than the priority of the broadcast message and the other of which has a priority lower than the priority of the broadcast message, may be determined, and the insertion location of the broadcast message may be determined to be between the two adjacent broadcast messages.

When the priority of the broadcast message is compared with the priorities of the broadcast messages in the broadcast message queue, it may be determined whether there is a broadcast message in the broadcast message queue having the same priority, and if so, the insertion location of the broadcast message may directly be determined according to a location at which the broadcast message with same priority is located in the broadcast message queue. The determined insertion location may be next to the broadcast message with same priority and adjacent to the broadcast message with same priority in the broadcast message queue. If there is no broadcast message in the broadcast message queue that has the same priority with the broadcast message, there are three case to be processed separately, which are a case where the priority is higher than that of all the broadcast messages in the broadcast message queue, a case where the priority is lower than that of all the broadcast messages in the broadcast message queue, and a case where the priority is between the priorities of the broadcast messages in the broadcast message queue. The priority of the broadcast message may be determined by case, and then the processing speed of the broadcast message can be speeded up.

At block 150, the method inserts the broadcast message into the broadcast message queue according to the insertion location.

The broadcast message is arranged at the insertion location in the broadcast message queue based on the determined insertion location.

In this embodiment, when it monitors a broadcast message sent from a broadcast sender, the broadcast receiver of the broadcast message is determined, the priority of the broadcast message is determined according to the broadcast receiver, the insertion location of the broadcast message is determined according to the priority, and then the broadcast message is inserted into the broadcast message queue. Since the location of the broadcast message in the broadcast message queue is determined according to the priority, broadcast messages with high priority can be processed in time and quickly and important broadcast messages can be processed timely, so as to avoid abnormalities for system functions.

Figure 2:
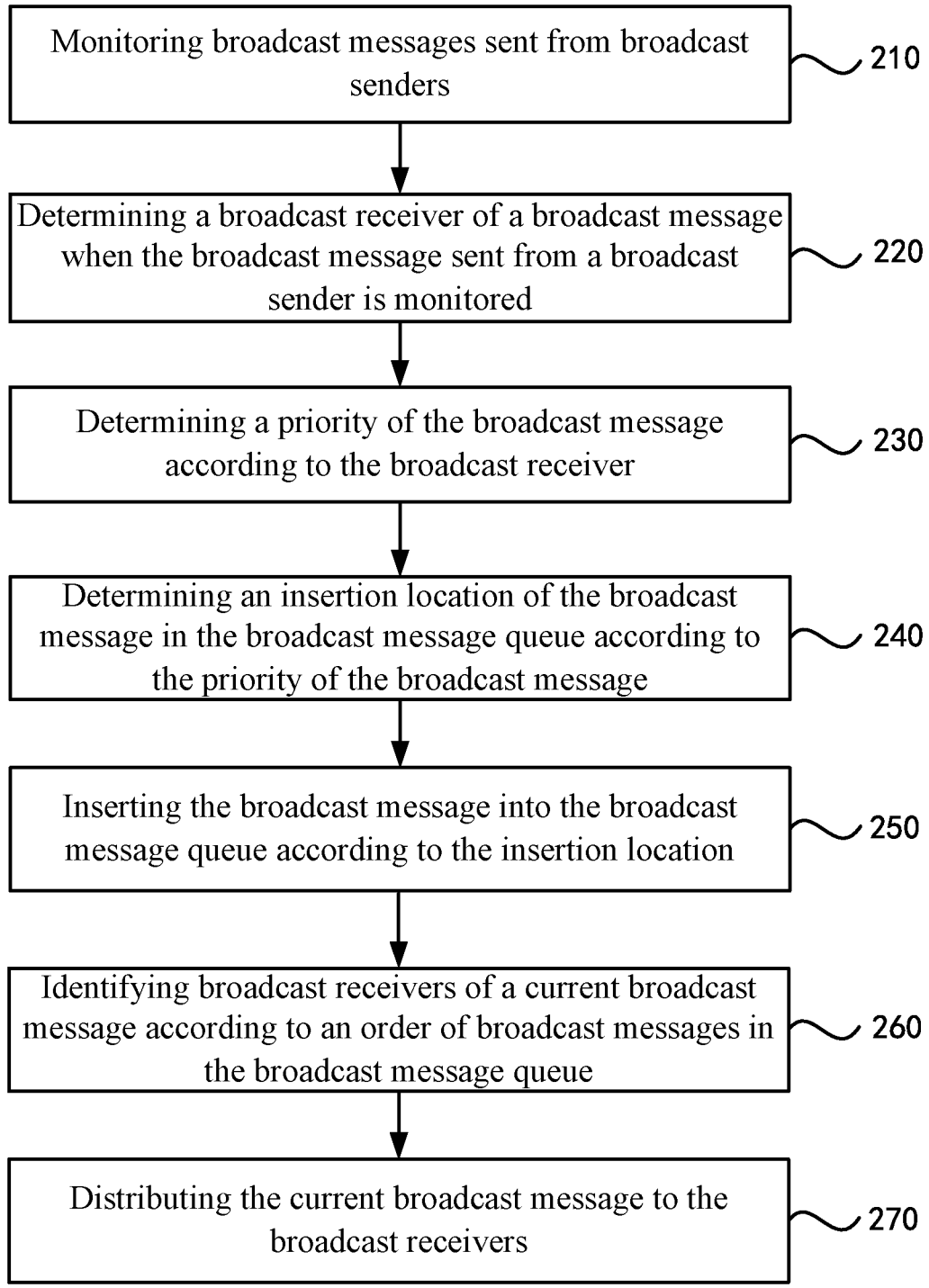
FIG. 2 is a flowchart of a method for arranging a broadcast message according to another embodiment.

FIG. 2 is a flowchart of a method for arrange a broadcast message according to another embodiment of the present disclosure. The method includes the following actions/operations.

At block 210, the method monitors broadcast messages sent from broadcast senders.

At block 220, the method determines a broadcast receiver of the broadcast message when the broadcast message sent from the broadcast sender is monitored.

At block 230, the method determines a priority of the broadcast message according to the broadcast receiver.

At block 240, the method determines an insertion location of the broadcast message in the broadcast message queue according to the priority of the broadcast message.

At block 250, the method inserts the broadcast message into the broadcast message queue according to the insertion location.

At block 260, the method identifies broadcast receivers of a current broadcast message according to an order of broadcast messages in the broadcast message queue.

In this embodiment, the broadcast message queue is arranged according to the priorities of broadcast messages, and the broadcast message queue is changing continuously and dynamically. During the operation of the terminal, the broadcast message queue is continuously updated. Broadcast messages that have been distributed are cleared from the broadcast message queue, and it is also possible to have new broadcast messages entering the broadcast message queue when broadcast messages in the broadcast message queue are distributed. For example, the broadcast message queue includes a broadcast message 1, a broadcast message 2, a broadcast message 3, a broadcast message 4 . . . a broadcast message 100 in an order of broadcast messages. When the broadcast messages are distributed according to the order of broadcast messages in the broadcast message queue, the broadcast message 1 is firstly sent, and then the broadcast message 2 is sent after the broadcast message 1 has been sent, until all of the broadcast messages in the broadcast message queue have been sent.

The current broadcast message may be a broadcast message to be sent. For example, the broadcast message queue includes a broadcast message 1, a broadcast message 2, a broadcast message 3, a broadcast message 4 . . . a broadcast message 100 in an order of sending. If the broadcast message 1 is the current broadcast message, then the broadcast message 2 is the broadcast message to be sent currently. If a broadcast message located before the broadcast message 1 has just been sent, the broadcast message 1 may also be the broadcast message to be sent currently. The broadcast receiver can be a third-party application installed on the terminal or an application by the system itself. For example, in the Android system, when the broadcast receiver of the current broadcast message is identified, ActivityManagerService checks which broadcast receivers subscribe to the broadcast message in its own register center, and then the broadcast receivers of the broadcast message may be determined.

At block 270, the method distributes the current broadcast message to the broadcast receivers.

After the broadcast receivers of the broadcast message to be sent currently has been identified, the broadcast message is sequentially sent to one or more broadcast receivers, which ensures that the broadcast receivers respond the broadcast message timely.

In this embodiment, when it monitors a broadcast message sent from a broadcast sender, a broadcast receiver of the broadcast message is determined, the priority of the broadcast message is determined according to the broadcast receiver, the insertion location of the broadcast message is determined according to the priority, then the broadcast message is inserted into the broadcast message queue, and the broadcast messages are sent according to the order of the broadcast messages in the broadcast message queue. Thus, important broadcast message can be sent out timely and quickly, and it can ensure that the broadcast receiver s respond the broadcast message timely, which avoids abnormalities for system functions.

Figure 3:
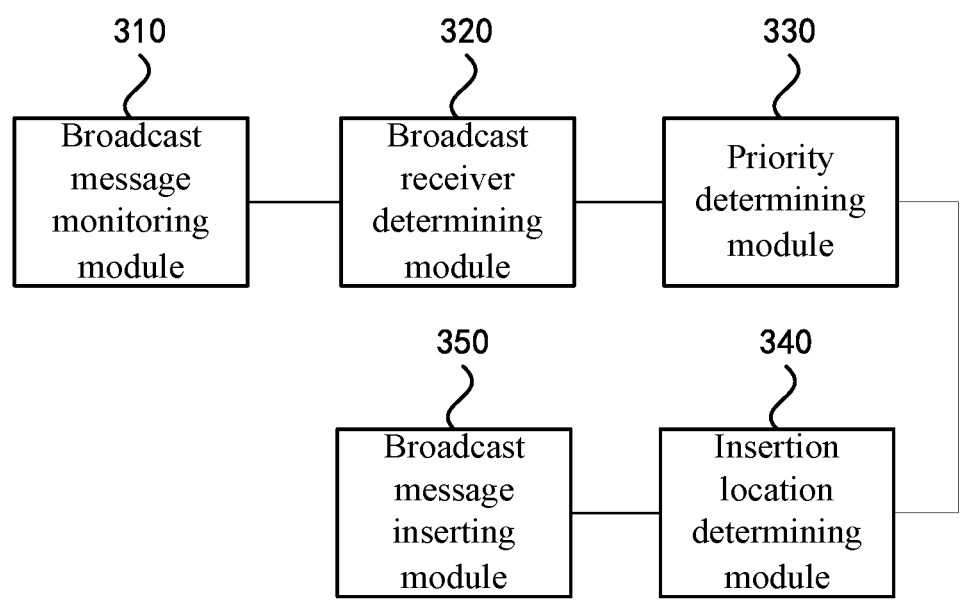
FIG. 3 is a schematic structural diagram of an apparatus for arranging a broadcast message according to an embodiment.

FIG. 3 is a schematic structural diagram of an apparatus for arranging a broadcast message according to an embodiment. As shown in FIG. 3, the apparatus for arranging a broadcast message according to this embodiment includes a broadcast message monitoring module 310 and a broadcast receiver determining module 320, a priority determining module 330, an insertion location determining module 340, and a broadcast message inserting module 350.

The broadcast message monitoring module 310 is configured to monitor broadcast messages sent from broadcast senders.

The broadcast receiver determining module 320 is configured to determine a broadcast receiver of the broadcast message when the broadcast message sent from a broadcast sender is monitored.

The priority determining module 330 is configured to determine a priority of the broadcast message according to the broadcast receiver.

The insertion location determining module 340 is configured to determine an insertion location of the broadcast message in a broadcast message queue according to the priority of the broadcast message.

The broadcast message insertion module 350 is configured to insert the broadcast message into the broadcast message queue according to the insertion location.

In an embodiment, the priority determining module 330 includes the following.

A use frequency counting unit, which is configured to count a use frequency of the broadcast receiver in a preset period.

A priority determining unit, which is configured to determine the priority of the broadcast message according to the use frequency.

In an embodiment, the priority determining unit is configured to determine a frequency range in which the use frequency is located; and determine the priority of the broadcast message according to the frequency range.

In an embodiment, the priority determining module 330 includes the following.

A highest priority determining unit, which configured to determine that the broadcast message has a higher priority than all broadcast messages in the broadcast message queue when the broadcast receiver of the broadcast message is currently running.

In an embodiment, the insertion location determining module 340 includes the following.

A priority comparing unit, which is configured to compare the priority of the broadcast message with priorities of the broadcast messages in the broadcast message queue.

An insertion location determining unit, which is configured to determine the insertion location of the broadcast message in the broadcast message queue according to a result of the comparing.

In an embodiment, the insertion location determining unit is configured to the following actions/operations.

Determine the insertion location of the broadcast message to be next to a broadcast message with same priority when there is a broadcast message in the broadcast message queue having the same priority with the broadcast message.

Determine whether the priority of the broadcast message is higher than that of all broadcast messages in the broadcast message queue when there is no broadcast message having the same priority with the broadcast message in the broadcast message queue.

Determine the insertion location of the broadcast message to the head of the broadcast message queue when the priority of the broadcast message is higher than that of all broadcast messages in the broadcast message queue.

Determine whether the priority of the broadcast message is lower than that of all broadcast messages in the broadcast message queue when the priority of the broadcast message is not higher than that of all broadcast messages in the broadcast message queue.

Determine the insertion location of the broadcast message to the tail of the broadcast message queue when the priority of the broadcast message is lower than that of all broadcast messages in the broadcast message queue.

Determine two adjacent broadcast messages with a priority higher than and lower than the priority of the broadcast message in the broadcast message queue, and determine the insertion location of the broadcast message to be between the two adjacent broadcast messages when the priority is not lower than that of all broadcast messages in the broadcast message queue.

In an embodiment, the apparatus further includes the following.

A broadcast receiver identifying module, which is configured to identify broadcast receivers of the current broadcast message according to an order of broadcast messages in the broadcast message queue after the inserting the broadcast message into the broadcast message queue.

A broadcast message distributing module, which is configured to distribute the current broadcast message to the broadcast receivers.

The apparatus for arranging broadcast messages described above may perform the method for arranging a broadcast message provided by any embodiments of the present disclosure, and has corresponding function modules and a beneficial effect for executing the method. For a technical detail that is not described in detail in this embodiment, reference may be made to a method for arranging broadcast messages provided by any embodiments of the present disclosure.

Figure 4:
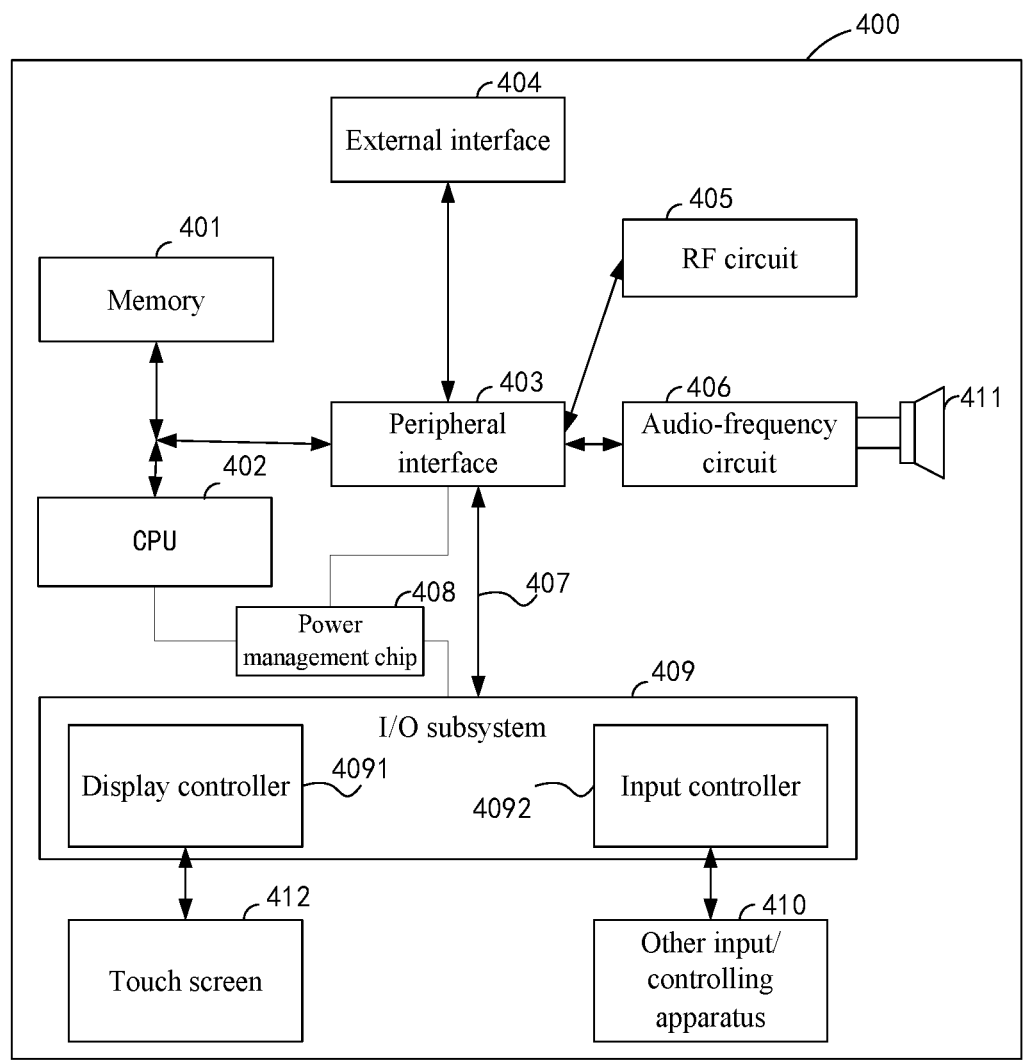
FIG. 4 is a schematic structural diagram of a terminal according to an embodiment.

A terminal is further provided in an embodiment. FIG. 4 is a structural diagram of a terminal according to an embodiment. As shown in FIG. 4, the terminal may include a housing (not shown in the figure), a memory 401, a central processing unit (CPU) (also called as processor) 402, a computer program stored in the memory and executable on the CPU 402, a circuit board (not shown in the figure), and a power circuit (not shown in the figure). The circuit board may be disposed within the space defined by the housing. The CPU 402 and the non-transitory memory 401 may be arranged on the circuit board. The power circuit may provide power to each circuit or element of the terminal. The memory 401 may store computer programs executable on a processor. The CPU 402 may read and run computer programs stored in the memory 401.

The terminal may further include a peripheral interface 403, a radio frequency (RF) circuit 405, an audio-frequency circuit 406, a loudspeaker 411, a power management chip 408, an input/output (I/O) subsystem 409, a touch screen 412, other input/controlling apparatus 410, and an external interface 404, all of which may communicate through one or more communication buses or signal lines 407.

The terminal 400 shown in the figure is only an example of terminals, the terminal 400 may contain more or less of the components than those illustrated in the figure, two or more of the components may be combined, or the arrangement of the components may be changed. The components illustrated in the figure may be realized by hardware, software, or combination thereof, wherein the hardware and software may include one or more signal processors and/or application specific integrated circuits.

The terminal for arranging a broadcast message according to an embodiment will be described in details herein, and a mobile phone may be used as an example of the terminal.

The non-transitory memory 401 may be accessed by the CPU 402, peripheral interface 403 and the like. The non-transitory memory 401 may include high speed random access memory or non-volatile memory such as disk type storage device, a flash memory device, or other volatile solid state memory device.

The peripheral interface 403 may connect input and output of the device to the CPU 402 and the non-transitory memory 401.

The I/O subsystem 409 may set input and output peripheral. For example, the touch screen 412 and other input/controlling apparatuses 410 may be connected to the peripheral interface 403. The I/O subsystem 409 may include a display controller 4091 and one or more input controllers 4092 to control other input/controlling devices 410. The one or more input controllers 4092 may receive electrical signals from other input/controlling devices 410 or send electrical signals to other input/controlling devices 410, wherein the other input/controlling devices 410 may include a physical button (a pressing button, a rocker button and the like), a dial plate, a sliding switch, a joystick, or a clicking wheel. To be noted that, the input controller 4092 may connect to any one of the following: a keyboard, an infrared port, an USB interface, and an indicating equipment such as a mouse.

The touch screen 412 may an input interface and an output interface between a user and the terminal of the user. Visual output may be displayed to the user, wherein the visual output may include a graph, a text, an icon, a video, and the like.

The display controller 4091 of the I/O subsystem 409 may receive electrical signals from the touch screen 412 or send electrical signals to the touch screen 412. The touch screen 412 may detect touching of the screen, the display controller 4091 may convert the detected touching into an interaction with a user interface object displayed on the touch screen 412, which realizes human-computer interaction. The user interface object displayed on the touch screen 412 may be an icon for running a game, an icon for connecting into a certain network, and the like. To be noted that, the device may also include an optical mouse, which is a touch-sensitive surface without display of visual output or an extension of the touch-sensitive surface defined by the touch screen.

The RF circuit 405 may be used to establish communication between the mobile phones and wireless network (i.e. a network side), realizing data receipt and sending between the mobile phone and the wireless network. For example, receiving and sending messages, emails and the like. To be specific, the RF circuit 405 may receive and send RF signals, which are also called electromagnetic signals, the RF circuit 405 may convert electrical signals into electromagnetic signals or convert electromagnetic signals into electrical signals, and communicate with communication networks and other devices through the electromagnetic signals. The RF circuit 405 may include a known circuit for executing the above functions, wherein the known circuit may include but not limit to an antenna system, an RF transceiver, one or more amplifiers, a tuner, one or more oscillators, a digital signal processor, a chipset of coder-decoder (CODEC), a subscriber identity module (SIM), and the like.

The audio-frequency circuit 406 may receive audio-frequency data from the peripheral interface 403, and convert the audio-frequency data into electrical signals, which may be sent to the loudspeaker 411.

The loudspeaker 411 may reconvert the audio signals received from the wireless network through the RF circuit of the mobile phone into the sound, and play the sound to the user.

The power management chip 408 may supply power to hardware connected through the CPU 402, the I/O subsystem and the peripheral interface, and perform power management.

The CPU 402 in the embodiment is configured to the following actions/operations when executing the computer program stored in the memory 401.

Monitoring broadcast messages sent from broadcast senders.

Determining a broadcast receiver of a broadcast message when the broadcast message sent from the broadcast sender is monitored.

Determining a priority of the broadcast message according to the broadcast receiver.

Determining an insertion location of the broadcast message in a broadcast message queue according to the priority of the broadcast message.

Inserting the broadcast message into the broadcast message queue according to the insertion location.

The terminal described above may perform the method for arranging a broadcast message according to any embodiments of the present disclosure, and has corresponding function modules and a beneficial effect for executing the method.

A computer-readable storage medium is further provided in an embodiment. it stores instructions executable by a computer, the instructions executed by the computer to perform any method described above.

The storage medium may be a non-transitory storage medium or a transitory storage medium. The non-transitory storage medium may include a U-disk, a removable hard disk, a read-only memory (ROM), a random access memory (RAM), a magnetic disk or optical disk, which may store program code.

All or part of the processes in above-described embodiments may completed by indicating relevant hardware by a computer program, the program may be stored in a non-transitory computer-readable storage medium, when the program is executed, may include a flow of a method as described above.

INDUSTRIAL APPLICABILITY

A method and an apparatus for arranging a broadcast message, and a terminal are provided in the present disclosure, which can determine the location of a broadcast message in a broadcast message queue according to a priority, so that broadcast messages with high priority can be processed in time and quickly and important broadcast messages can be processed timely, so as to avoid abnormalities for system functions.

What is claimed is:

1. A method for arranging a broadcast message in an operating system, comprising:
    determining a broadcast receiver of the broadcast message when the broadcast message is sent from the broadcast sender;
    determining a priority of the broadcast message according to the broadcast receiver, wherein the broadcast sender and the broadcast receiver are the operation system or an application, and the broadcast message sent from the broadcast sender is monitored through ActivityManagerService;
    determining an insertion location of the broadcast message in a broadcast message queue according to the priority of the broadcast message; and
    arranging the broadcast message at the insertion location such that the broadcast message is inserted into the broadcast message queue,
    wherein the determining the priority of the broadcast message according to the broadcast receiver comprises:
        counting a use frequency of the broadcast receiver in a preset period;
        determining a frequency range in which the use frequency is located; and
        determining the priority of the broadcast message according to the frequency range.

2. The method of claim 1, wherein a correspondence between frequency ranges and priorities of broadcast messages is established in advance, such that the priority of the broadcast message is determined according to the frequency range in which the use frequency is located.

3. The method of claim 1, wherein the determining a priority of the broadcast message according to the broadcast receiver comprises:
    determining that the broadcast message has a higher priority than all broadcast messages in the broadcast message queue when the broadcast receiver of the broadcast message is currently running.

4. The method of claim 1, wherein the broadcast message queue comprises a plurality of broadcast messages, each of the plurality of broadcast messages in the broadcast message queue has a corresponding priority; and
    the determining an insertion location of the broadcast message in a broadcast message queue according to the priority of the broadcast message comprises:
        comparing the priority of the broadcast message with priorities of the broadcast messages in the broadcast message queue; and
        determining the insertion location of the broadcast message in the broadcast message queue according to a result of the comparing.

5. The method of claim 4, wherein a broadcast message with a first priority in the broadcast message queue is located before another broadcast message with a second priority in the broadcast message queue, wherein the first priority is higher than the second priority.

6. The method of claim 5, wherein the determining the insertion location of the broadcast message in the broadcast message queue according to a result of the comparing comprises:
   determining the insertion location of the broadcast message to be next to one broadcast message in the broadcast message queue when the one broadcast message in the broadcast message queue has a priority same to that of the broadcast message;
   determining whether the priority of the broadcast message is higher than that of all broadcast messages in the broadcast message queue when no broadcast message in the broadcast message queue has a priority same to that of the broadcast message;
   determining the insertion location of the broadcast message to be a head of the broadcast message queue when the priority of the broadcast message is higher than that of all broadcast messages in the broadcast message queue;
   determining whether the priority of the broadcast message is lower than that of all broadcast messages in the broadcast message queue when the priority of the broadcast message is not higher than that of all broadcast messages in the broadcast message queue;
   determining the insertion location of the broadcast message to be a tail of the broadcast message queue when the priority of the broadcast message is lower than that of all broadcast messages in the broadcast message queue; and
   determining two adjacent broadcast messages in the broadcast message queue which have priorities adjacent to the priority of the target broadcast message, and determining the insertion location of the broadcast message to be between the two adjacent broadcast messages when the priority is not lower than that of all broadcast messages in the broadcast message queue, wherein one of the two adjacent broadcast messages has a priority higher than the priority of the broadcast message and another of the two adjacent broadcast messages has a priority lower than the priority of the broadcast message.

7. The method of claim 1, after the inserting the broadcast message into the broadcast message queue, further comprising:
   identifying broadcast receivers of a current broadcast message according to an order of broadcast messages in the broadcast message queue; and
   distributing the current broadcast message to the broadcast receivers.

8. The method of claim 1, wherein the operating system comprises Android system.

9. The method of claim 1, wherein the broadcast receiver of the broadcast message is determined through a broadcast receiving process configured for registering to receive the broadcast message.

10. An electronic device, comprising a non-transitory memory storing a computer program, and a processor, wherein the processor is configured to execute the computer program to:
   determine a broadcast receiver of a first broadcast message when the first broadcast message is sent from a broadcast sender;
   determine a priority of the first broadcast message according to the broadcast receiver, wherein the broadcast sender and the broadcast receiver are the operation system or an application, and the broadcast message sent from the broadcast sender is monitored through ActivityManagerService;
   determine an insertion position of the first broadcast message in a broadcast message queue according to the priority of the first broadcast message; and
   arrange the first broadcast message at the insertion location such that the first broadcast message is inserted into the broadcast message queue,
   wherein determining a priority of the broadcast message according to the broadcast receiver comprises:
      counting a use frequency of the broadcast receiver in a preset period;
      determining a frequency range in which the use frequency is located; and
      determining the priority of the broadcast message according to the frequency range.

11. The electronic device of claim 10, wherein the priority of the first broadcast message is determined according to the use frequency of the broadcast receiver in a preset period.

12. The electronic device of claim 11, wherein the priority of the first broadcast message is determined according to a frequency range in which the use frequency is located.

13. The electronic device of claim 10, wherein the broadcast message queue comprises a plurality of second broadcast messages;
   the priority of the first broadcast message is determined according to whether the broadcast receiver of the first broadcast message is currently running, wherein the priority of the first broadcast message is higher than that of all the second broadcast messages when the broadcast receiver of the first broadcast message is currently running.

14. The electronic device of claim 10, wherein the broadcast message queue comprises a plurality of second broadcast messages, each of the plurality of second broadcast messages has a corresponding priority; and
   the insertion location of the first broadcast message in the broadcast message queue is determined according to a result of comparing the priority of the first broadcast message with priorities of the second broadcast messages.

15. The electronic device of claim 14, wherein a second broadcast message with a first priority in the broadcast message queue is located immediately before another second broadcast message with a second priority in the broadcast message queue, wherein the first priority is higher than the second priority.

16. The electronic device of claim 15, wherein
   the insertion location of the first broadcast message is determined to be next to one second broadcast message in the broadcast message queue when the one second broadcast message and the first broadcast message have the same priority;
   the insertion location of the first broadcast message is determined to be a head of the broadcast message queue when the priority of the first broadcast message is higher than that of all the second broadcast messages;
   the insertion location of the first broadcast message is determined to be a tail of the broadcast message queue when the priority of the first broadcast message is lower than that of all the second broadcast messages; and
   the insertion location of the first broadcast message is determined to be between two adjacent second broadcast messages which have priorities adjacent to the priority of the first broadcast message when the priority of the first broadcast message is not lower than that of all the second broadcast messages in the broadcast message queue, wherein one of the two adjacent second broadcast message has a priority higher than the priority of the first broadcast message, and another of the two adjacent second broadcast message has a priority lower than the priority of the second broadcast message.

17. The electronic device of claim 10, wherein the operating system comprises Android system.

18. The electronic device of claim 10, wherein the broadcast receiver of the first broadcast message is determined through a broadcast receiving process configured for registering to receive the first broadcast message.

19. A non-transitory storage medium storing a computer program, when executed, causing a processor to:
- determine a broadcast receiver of a first broadcast message when the first broadcast message is transmitted by a broadcast sender;
- determine a priority of the first broadcast message according to the broadcast receiver, wherein the broadcast sender and the broadcast receiver are the operation system or an application, and the broadcast message sent from the broadcast sender is monitored through ActivityManagerService;
- determine an insertion position of the first broadcast message in a broadcast message queue according to the priority of the first broadcast message; and
- arrange the first broadcast message at the insertion location such that the first broadcast message is inserted into the broadcast message queue,
- wherein determining a priority of the broadcast message according to the broadcast receiver comprises:
  - counting a use frequency of the broadcast receiver in a preset period;
  - determining a frequency range in which the use frequency is located; and
  - determining the priority of the broadcast message according to the frequency range.

* * * * *